Figure 1:
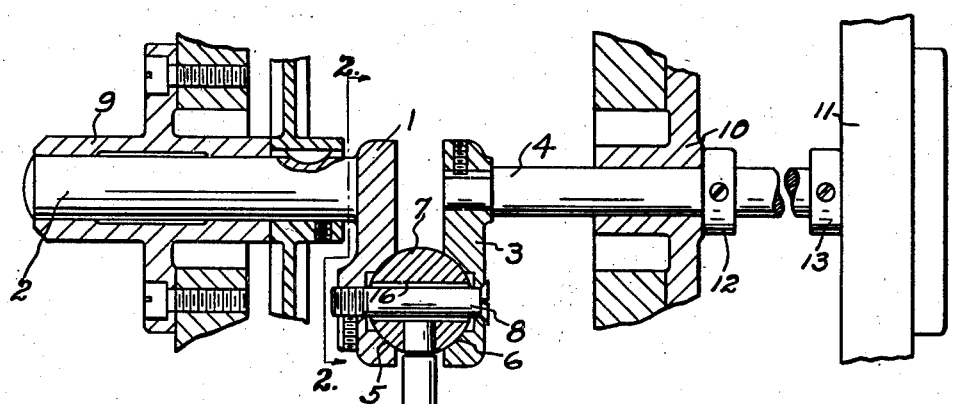

May 1, 1945.   J. WAWZONEK ET AL   2,374,907
CRANKSHAFT
Filed June 9, 1944

INVENTORS:
JOSEPH WAWZONEK,
EUGENE ST PIERRE,
ATT'Y.

Patented May 1, 1945

2,374,907

UNITED STATES PATENT OFFICE 2,374,907

CRANKSHAFT

Joseph Wawzonek, Central Falls, and Eugene St. Pierre, Pawtucket, R. I., assignors to Hemphill Company, Central Falls, R. I., a corporation of Massachusetts Application June 9, 1944, Serial No. 539,536

4 Claims. (Cl. 74—598)

This invention relates to a new and useful improvement in sectional crankshafts of the type in which each arm of the crank and its associated section of the shaft is a separate unit, between which is a separate bearing for the connecting rod or its equivalent instead of the usual rigid crank pin.

The purpose of this device is to simplify the manufacture and assembly of machines in which a crankshaft is employed by eliminating the necessity of exact alignment of the crankshaft with the other associated shafts and of the crank and connecting rod with the device connected thereto and to reduce the cost of manufacture by eliminating the usual integral crank pin.

Figure 2:
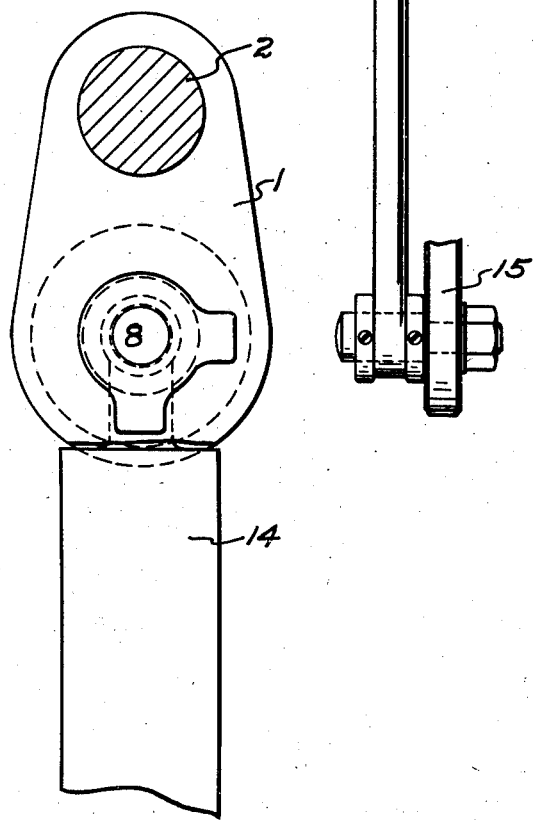

One form of the invention is shown in the drawing of which:

Fig. 1 is a general view partly in section of the crankshaft and a connecting rod; and Fig. 2 is an end view partly in section of the crankshaft and connecting rod on the line 2—2 of Fig. 1, viewed as indicated by the arrows.

The crankshaft consists essentially of a crank arm 1 to which is rigidly attached one section 2 of the shaft and a similar crank arm 3 to which is similarly attached the other section 4 of the shaft. In the opposed faces of the outer ends of crank arms 1 and 3 are depressions 5 and 6 of spherical contour in which a ball 7 of corresponding spherical dimensions is positioned.

The assembly of shafts 2 and 4, crank arms 1 and 3 and ball 7 is maintained by a screw 8 passing through apertures in the arms and the ball and threaded into the aperture of one of the arms as shown in Fig. 1. The desired working fit between the depressions 5 and 6 in the crank arms and ball 7 is obtained by adjusting this screw 8.

When assembled, shaft sections 2 and 4 will, of course, be in alignment and may be mounted in suitable bearings. As shown, shaft section 2 is mounted in a bearing 9 so that it is free to slide endwise. Shaft section 4, on the other hand, is mounted in bearings 10 and 11 and restrained from longitudinal movement in both directions by collars 12 and 13 respectively. If these collars are loosened the entire crankshaft assembly may be moved longitudinally in either direction to any desired extent. Attached to ball 7 is one end of a connecting rod 14 the other end of which is attached to whatever mechanism 15 the crank is to operate.

The aperture 16 in ball 7 through which the screw 8 passes is considerably larger than the diameter of the screw so that to a limited extent ball 7 and connecting rod 14 are free to swing to the right or left as viewed in Fig. 1. Screw 8 obviously imposes no restriction whatever on the swinging of the ball and connecting rod in directions at right angles to this.

By this means if there happens to be a slight angular misalignment between shaft 7 upon which the driven part is presumably mounted and the crankshaft or a bend in the connecting rod or substantially any other minor inaccuracy of angular alignment in which the crankshaft is involved efficient operation is obtained through the flexibility of the connecting rod bearing provided by the ball and socket arrangement constituting, within limits, a universal joint.

The surfaces of ball 7 adjacent aperture 16 are preferably flattened and the corresponding portions at the bottoms of spherical recess 5 and 6 in crank arms 1 and 3 recessed so that arms 1 and 3 may be brought closer together by screw 8 to compensate for any wear which may occur and also to provide a cavity for lubricant.

We claim:

1. A crankshaft consisting of a rotatable shaft in two sections each having a crank arm rigidly attached to one end, a depression of spherical contour in the free end of each crank arm, a ball of corresponding spherical dimensions supported within said depressions, adjustable means for holding said crank arms and said ball together, a connecting rod associated with said ball, the depth of said depressions being such that the crank arms are sufficiently separated to permit the connecting rod to pass between them when the shaft is rotated.

2. A crankshaft consisting of a rotatable shaft in two sections, a crank arm on one end of each section of the shaft, a depression of spherical contour in the free end of each crank arm, a ball of corresponding spherical dimensions supported within said depressions and adapted for association with a driven member, adjustable means passing through apertures in both crank arms and the ball for maintaining working contact between said crank arm and said ball, the depth of the depressions in said crank arms being such that the arms are spaced apart by said ball a distance greater than the thickness of said driven member.

3. A crankshaft according to claim 1 in which the bottom of each depression is recessed.

4. A crankshaft according to claim 2 in which there is a substantial clearance between the ball and the adjustable means.

JOSEPH WAWZONEK.
EUGENE ST. PIERRE.